J. P. COOPER.
MACHINE FOR OVERCOMING THE DEAD POINTS OF THE CRANK.
No. 27,698.  Patented Apr. 3, 1860
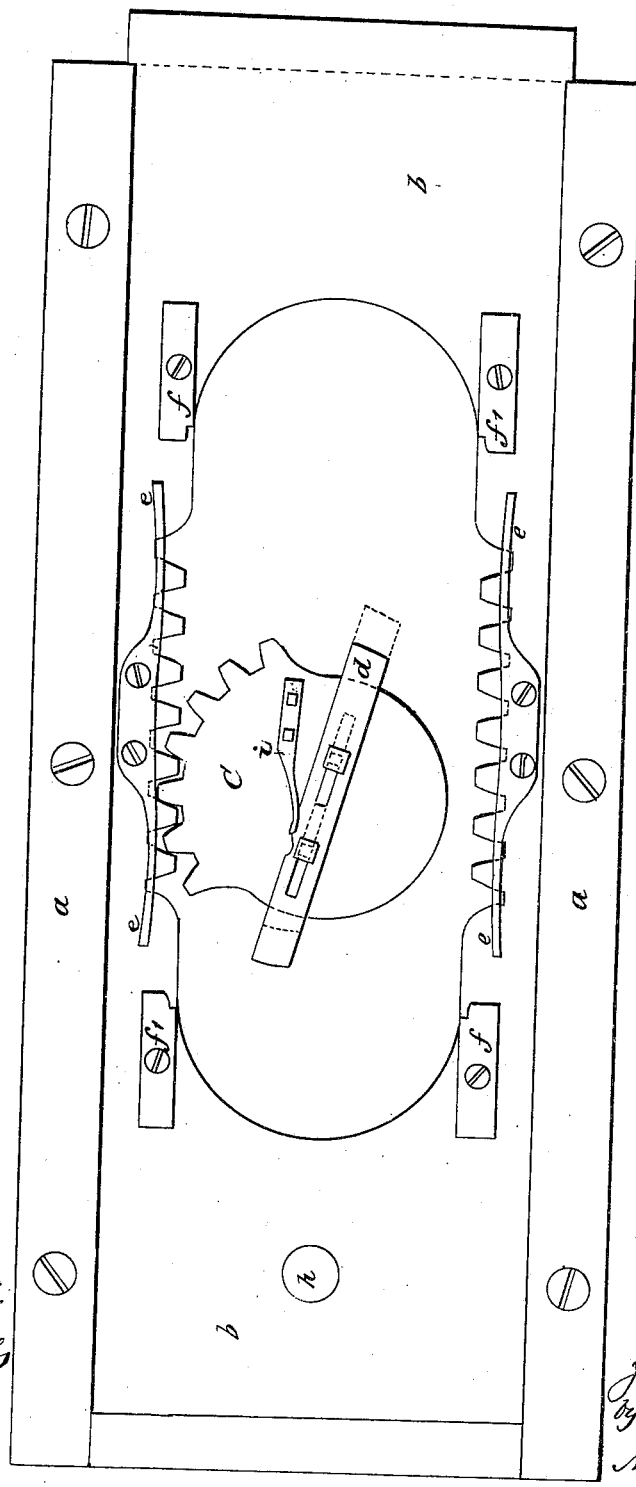
Witnesses.
Inventor.
John P Cooper
by James J Johnston
Atty for John P Cooper

UNITED STATES PATENT OFFICE.

JOHN P. COOPER, OF FINLEYVILLE, PENNSYLVANIA.

IMPROVEMENT IN MACHINES FOR OVERCOMING THE DEAD-POINTS OF CRANKS.

Specification forming part of Letters Patent No. 27,698, dated April 3, 1860.

*To all whom it may concern:*

Be it known that I, JOHN P. COOPER, of Finleyville, in the county of Washington and State of Pennsylvania, have invented a new and useful Improvement in Machines for Overcoming the Dead-Points of the Crank; and I do hereby declare that the following is a full and exact description thereof, reference being had to the accompanying drawings, and to the letters of reference marked thereon.

The nature of my invention consists in the use of a double rack, slide, wheel, springs, and stops, arranged and combined in the manner hereinafter described, for the purpose of overcoming the dead-points of the crank.

To enable others skilled in the art to make and use my invention, I will proceed to describe its construction and operation.

In the accompanying drawings, Figures 1, 2, and 3 are photographic views of the machine, and represent the rack, slide, wheel, and shifting tooth in different positions.

$a$ is the slide.

$b$ is the rack, which is furnished with two sets of teeth, as represented in the accompanying drawings.

$c$ is the wheel, which is to supply the place of the crank, and may be placed on the end or at any other point of the shaft desired. The wheel $c$ is furnished with a shifting tooth $d$, which is held to the side of the wheel by means of two bolts. The shifting tooth is furnished with two slots, which allow the tooth to move back and forward, and is kept in working position by the springs $i$.

$e$ are springs placed on each side of the rack in connection with the shifting tooth $d$ and are used for the purpose of guiding the wheel $c$ into its proper gear with the rack $b$.

$f$ and $f'$ are stops and reversing-points.

$h$ is the wrist, to which a pitman of an engine may be attached.

The stops $f'$ change the position of the shifting tooth $d$, thereby reversing the motion of the wheel $c$ from left to right, and the stops $f$ change the position of the tooth $d$, which changes the motion of the wheel $c$ from right to left. When the shifting tooth $d$ is in the position represented in Figs. 1 and 3, the wheel $c$ will turn to the right, and when the tooth $d$ is in the position represented in Fig. 2 the wheel $c$ will turn to the left.

Having thus described the nature, construction, and operation of my improvement, what I claim as of my invention, and desire to secure by Letters Patent of the United States, is—

1. The use of the shifting tooth $d$, springs $e$ and $i$, and stops $f$ and $f'$, when used in connection with the wheel $c$, rack $b$, and slide $a$, as herein described, and for the purpose set forth.

2. The combination and arrangement of the wheel $c$, rack $b$, and slide $a$, as herein described, and for the purpose set forth.

JOHN P. COOPER.

Witnesses:
 GEORGE P. STECK,
 J. H. SCOTT.